United States Patent [19]

Hayden

[11] Patent Number: 4,478,318

[45] Date of Patent: Oct. 23, 1984

[54] VEHICLE BRAKE SYSTEM

[75] Inventor: Ronald D. Hayden, Eastlake, Ohio

[73] Assignee: Euclid, Inc., Cleveland, Ohio

[21] Appl. No.: 378,131

[22] Filed: May 14, 1982

[51] Int. Cl.³ .................. F16D 55/18; B60T 11/10; B60T 15/46; F15B 13/042

[52] U.S. Cl. ............................ 188/72.4; 91/28; 188/151 A; 303/84 A

[58] Field of Search ............... 188/72.3, 72.4, 170, 188/106 P, 151 A, 216, 366, 264 E; 303/6 R, 6 A, 85 AA, 84 R, 84 A; 192/30 U, 70.28, 83, 86, 101, 113 B; 91/207, 209, 28

[56] References Cited

U.S. PATENT DOCUMENTS

| | | | |
|---|---|---|---|
| 2,195,214 | 3/1940 | Jacob | 303/84 A |
| 2,502,547 | 4/1950 | Adams et al. | 91/209 |
| 2,519,900 | 8/1950 | Geiger et al. | 91/207 |
| 2,527,290 | 10/1950 | Anderson | 188/366 |
| 2,683,966 | 7/1954 | Tyler | 91/28 |
| 2,823,770 | 2/1958 | Helvern | 188/264 E |
| 2,928,504 | 3/1960 | Hahn et al. | 188/264 E |
| 3,105,582 | 10/1963 | Ziabicki | 192/113 B |
| 3,198,295 | 8/1965 | Fangman et al. | 188/264 E |
| 3,202,253 | 8/1965 | Merritt et al. | 192/113 B |
| 3,217,851 | 11/1965 | Mogk et al. | 192/85 AA |
| 3,556,607 | 1/1971 | Shutt et al. | 303/84 A |
| 3,556,616 | 1/1971 | Hensley | 188/151 A |
| 3,580,368 | 5/1971 | Heck | 188/264 E |
| 3,661,426 | 5/1972 | Tam | 303/84 A |
| 3,690,429 | 9/1972 | Honda | 192/113 B |
| 3,724,609 | 4/1973 | Kobald | 188/106 P |
| 3,760,912 | 9/1973 | Braun | 188/151 A |
| 3,927,737 | 12/1975 | Prillinger et al. | 188/170 |
| 3,941,219 | 3/1976 | Myers | 188/170 |
| 3,946,837 | 3/1976 | Houser | 188/72.4 |
| 4,077,500 | 3/1978 | Hickman, Sr. et al. | 188/366 |
| 4,207,969 | 6/1980 | Howell | 188/106 P |

FOREIGN PATENT DOCUMENTS 451918 11/1927 Fed. Rep. of Germany .
534401 3/1941 United Kingdom .

Primary Examiner—Duane A. Reger
Assistant Examiner—Robert J. Oberleitner
Attorney, Agent, or Firm—Watts, Hoffmann, Fisher & Heinke Co.

[57] ABSTRACT

An improved brake control apparatus for a brake system having redundant brake application fluid circuits 30, 32 and a brake retraction fluid circuit 62. A valve assembly 34, including a slidable two position valve element 60 communicates one brake application fluid circuit 30 with the retraction circuit 62, during normal brake actuation. The valve element 60 is biased towards one position by the combination of pressure in the other brake application circuit 32 and a resilient biasing arrangement 68, and biased towards the second position by pressure in the one application circuit 30. In the event of failure in the other application 32 circuit, the loss of biasing fluid pressure causes the valve element to shift to the second position, interrupting fluid communication from the one application circuit to the retraction circuit and drains fluid pressure in the retraction circuit into the failed circuit. The valve assembly also includes a check valve 62a and flow restriction 62b which cooperate with an accumulator 86 to delay the depressurization of the retraction circuit whenever the brakes are deenergized in order to obtain piston retraction.

9 Claims, 1 Drawing Figure

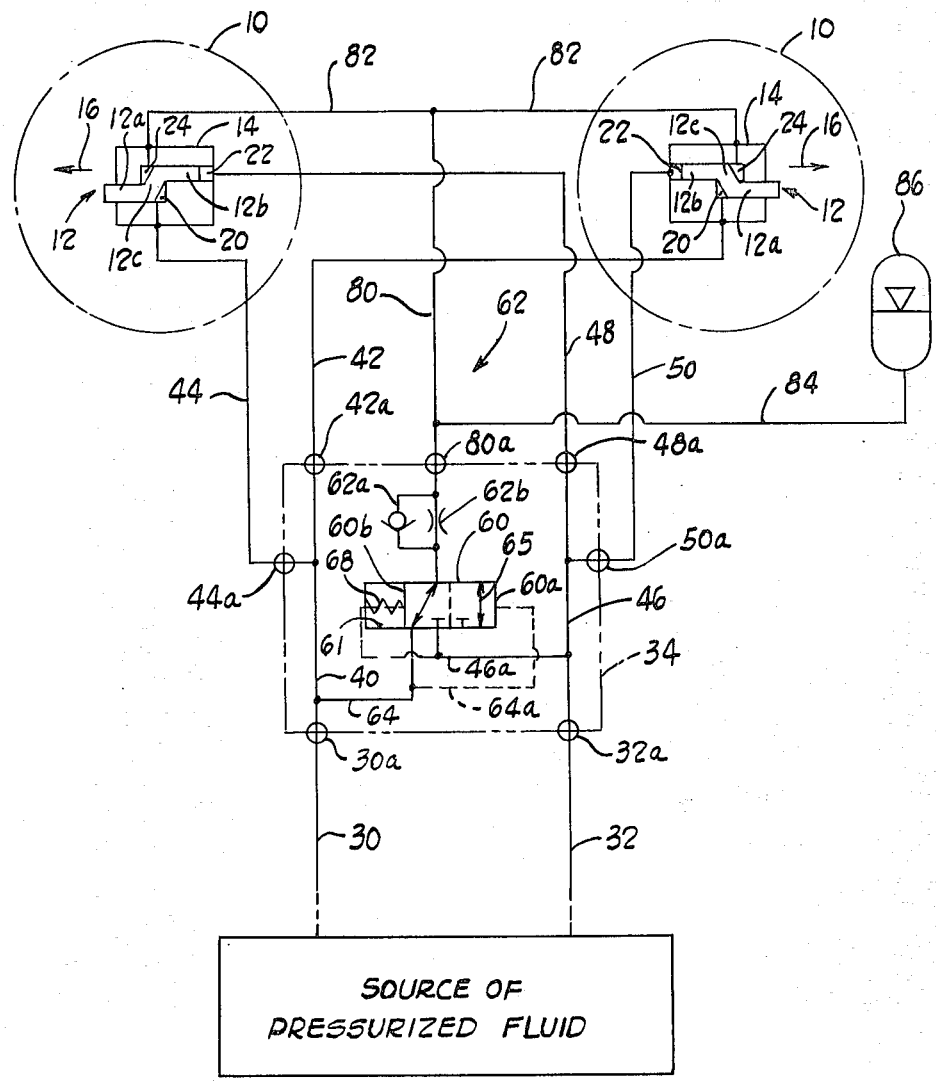

ly to vehicle
VEHICLE BRAKE SYSTEM

DESCRIPTION

Technical Field

The present invention relates generally to vehicle brake systems and in particular to an improved control system for a brake system having redundant brake application fluid circuits and a brake retraction fluid circuit.

Background Art

Fluid pressure operated brake systems are commonplace on both highway and off-highway vehicles. The performance and operability of the brake system is often dependent on the integrity of the fluid system. The loss of fluid as a result of conduit or component failure can precipitate partial or total brake failure. Methods and apparatus have been suggested by the prior art for applying the vehicle brakes even if the brake control system has failed. These proposals have included the use of redundant, independently operated fluid circuits as well as spring biased brake actuators which mechanically apply the brakes upon sensing loss of fluid pressure. Many of these proposals would appear to be prohibitively expensive.

A novel brake assembly and brake control system is disclosed in co-pending application, Ser. No. 148,538 filed May 9, 1980, which is owned by the assignee of the present application and is hereby incorporated by reference. The disclosed brake system includes a disc pack and a brake operating piston actuated by a fluid pressure system. The piston is shaped to define three effective pressure areas which communicate with three non-communicating fluid pressure chambers. The application of pressure to two of the effective pressure areas creates a force on the piston urging it into engagement with the disc pack whereas the application of pressure to the third area urges the piston in a brake release direction. The effective areas and fluid control system are configured so that the concurrent application of pressurized fluid to all three effective pressure areas produces a net force on the piston urging it in a brake application direction. Brake retraction is achieved by depleting pressure in the brake application pressure chambers while at least temporarily maintaining pressure in the brake retraction pressure chamber.

The disclosed brake system includes a valve for controlling the fluid communication between a source of pressurized fluid and the brake fluid chambers. Under normal operation, the valve allows pressurized fluid to proceed from the source to both brake application pressure chambers and additionally, communicates one of the brake application circuits with the retraction chamber in order to supply the brake retraction force. The valve includes a center balanced spool member that remains in a central position within the valve as long as equal fluid pressures are sensed in the brake application circuits. The loss of pressure in either of the brake application conduits cause the spool member to shift thereby draining the retraction circuit and preventing its pressurization so that the remaining, non-failed application circuit can effect brake actuation.

Although the disclosed brake control system performs satisfactorily, a less complex and costly control would be desirable.

Disclosure of the Invention

The present invention provides a new and improved control apparatus for a brake system having brake application and brake release fluid circuits. The disclosed control apparatus is operative to concurrently supply pressurized fluid to brake application and brake release fluid circuits under normal operating conditions and in the event of failure in one of the application circuits, is operative to drain and interrupt fluid communication to the brake release fluid circuit.

The preferred and illustrated embodiment of the invention is especially suited for the brake system disclosed in the co-pending application Ser. No. 148,538 filed May 9, 1980 which has been incorporated by reference. This co-pending application discloses a brake assembly that includes a housing which encloses a multi-disc pack and a fluid pressure operated piston for engaging and releasing the disc pack to effect braking of the vehicle.

The control apparatus of the present invention includes a valve for controlling the communication of pressurized fluid to the actuating piston to effect braking of the brake assembly under both normal and partially failed conditions. In the illustrated embodiment, the brake operating piston defines a plurality of effective pressure areas, communicating with associated, non-communicating fluid chambers. At least two of the chambers, when pressurized, urge the piston in a brake applying direction and at least one chamber urges the piston in a brake release direction, when pressurized. In the preferred configuration, a net brake application force is generated when substantially equal fluid pressures are communicated to all of the fluid chambers.

Redundant fluid circuits provide pressurized fluid to the brake applying fluid chambers, in response to an operator actuated valve. The control valve of the present invention communicates with the redundant fluid circuits and controls the pressurization of a retraction fluid circuit. In the preferred construction, the control valve includes a two-position valve member biased towards one position by the pressurized fluid in one of the brake applying circuits and biased towards a second position by the combination of a resilient biasing means, preferably a spring, and pressurized fluid in the other brake applying fluid circuit. Under normal braking conditions, equal fluid pressures exist in the brake applying fluid circuits and thus the resilient biasing means exerts a net force on the element, maintaining it in the first position. In the first position, one of the brake application fluid circuits is communicated with the retraction circuit so that during brake application, both the brake application and brake releasing fluid chambers are pressurized. In the event either brake application circuit losses pressure due to component leakage, conduit failure, etc., the control ensures the depressurization of the retraction circuit to extinguish and/or prevent the generation of, the brake release force.

In the preferred and illustrated embodiment, the valve member comprises a spool slidably mounted within a valve body bore. Pressure in the application circuits is communicated to opposed end faces of the spool and apply equal but opposed lateral forces. As long as the pressures in the application circuits remain substantially equal, the net force on the spool is zero and it therefore remains stationary. A biasing spring mounted between one end face of the spool and the end of the valve body bore urges the spool in one direction.

With equal, opposed fluid forces applied to the spool by the application circuits, the spring drives the spool to a first position at which fluid from one of the application circuits is communicated to the retraction circuit through passages formed in the valve body and the spool.

The valve and fluid circuits are arranged so that the fluid pressure in the one application circuit (which is communicated with the retraction circuit in normal operation) urges the spool toward the second position whereas the other application circuit, not normally communicated with the retraction circuit, urges the spool towards the first position. Should the one application circuit fail, the spool remains in its first position. Since the one application circuit supplies the retraction fluid pressure, its failure will automatically reduce or eliminate the brake release force. For this reason, the spool member need not move in order to prevent retraction circuit pressurization. If the other application circuit fails, the reduction in force on the spool will allow the pressure in the one application circuit to overcome the spring pressure and drive the spool to the second position. In this spool position, fluid communication from the one application circuit to the retraction circuit is interrupted.

The present invention provides an effective apparatus for automatically depressurizing the retraction circuit in the event of failure of either of the brake application circuits. The invention eliminates the need for a three-position, balanced spool member and its attendant cost. The valve disclosed by the invention is a simple yet reliable device for monitoring brake system integrity.

Additional features will become apparent and a fuller understanding of the invention will be obtained by reading the following detailed description made in connection with the accompanying drawings.

Brief Description of the Drawings The FIGURE schematically illustrates the overall construction of a brake system incorporating the present invention.

Best Mode for Carrying Out the Invention

The FIGURE illustrates the overall construction of a brake system incorporating a brake control apparatus constructed in accordance with the preferred embodiment of the invention. Brake assemblies 10, indicated schematically, preferably include friction brake members such as a plurality of interleaved non-rotatable and rotatable friction discs forming a disc pack (not shown) actuated by a piston 12 disposed in an associated piston housing 14. The directional arrows 16 indicate the direction of movement of the piston 12 to achieve brake actuation. As fully explained in co-pending application Ser. No. 148,538, the piston 12 is preferably shaped as an annulus comprising two cylindrical sections 12a, 12b joined by an intermediate section 12c. The piston 12 is mounted for sliding, axial movement towards and away from a friction disc pack by the piston housing 14. The housing 14 together with the piston 12 defines three, non-communicating fluid chambers 20, 22, 24 which communicate with three associated effective pressure areas defined on the piston. The chambers 20, 22, when pressurized, apply a force to the piston 12 urging it into operating engagement with the disc pack, thereby energizing the brake assembly (as indicated by the direction of the arrows 16). Fluid pressure communicated to the chamber 24 applies a retraction force to the piston urging it away from the disc pack.

Brake actuation is preferably obtained by concurrently pressurizing both the brake applying fluid chambers 20, 22 and the retraction chamber 24. With equal pressures communicated to each fluid chamber, a net force urging the piston 12 in the brake actuating direction 16 is generated.

Redundant brake application circuits are provided and include a pair of supply conduits 30, 32 which receive pressurized fluid from a source, as a function of movement in an operator control such as a treadle valve (not shown). The conduits 30, 32 are connected to a valve assembly 34 embodying the present invention through input ports 30a, 32a. An internal passage 40 formed within the valve assembly 34 communicates the supply conduit 30 with branch conduits 42, 44 which communicate with the brake application fluid chambers 20 in respective brake assemblies 10, through output ports 42a, 44a. A similar passage 46 communicates the supply conduit 32 with branch conduits 48, 50 which communicate with the application fluid chambers 22 in the brake assemblies 10 through ports 48a, 50a.

According to the invention, the valve assembly 34 includes apparatus for controlling the pressurization of the retraction chambers 24 in each of the brake assemblies 10. In accordance with this feature, the assembly 34 includes a shiftable, two-position valve element 60 preferably formed by a valve spool slidably mounted within a bore 61 defined by the valve assembly.

The valve spool 60 controls the fluid communication between the internal passage 40 and a retraction chamber supply circuit, indicated generally by the reference character 62. A branch passage 64 communicates with the passage 40. When the valve spool 60 is in the position shown in the FIGURE, the branch passage 64 is placed in fluid communication with the retraction circuit 62. In this valve position, the retraction circuit is pressurized whenever the supply conduit is pressurized.

The position of the valve spool is determined by the pressures in the brake application circuits. As viewed in the FIGURE the right end face 60a of the spool 60 is exposed to pressurized fluid in the passage 40 by way of a pilot line 64a connected to the branch passage 64. Fluid pressure in the passage 40 generates a fluid force on the spool 60 urging it toward the left as viewed in the FIGURE. An equal but opposite force is exerted on the left face 60b of the spool 60 by pressure in the passage 46 as communicated by way of a pilot line 46a. A force, additive to this fluid generated force, is exerted on the valve spool 60 by a resilient biasing element preferably a spring 68 which acts between the valve body and the valve spool 60. With equal fluid pressures in the passages 40, 46, the net force on the spool provided by the spring 68 drives the spool to its right most position as seen in the FIGURE. As indicated above, in this position, pressure in the internal passage 40 is communicated to the retraction circuit 62 via the branch passage 64.

Failure of the brake application circuit fed by the supply conduit 32, will cause the automatic depressurization of the retraction circuit 62 so that the brake release force normally present during brake actuation, is extinguished. Failure of this brake application circuit, such as leakage in the conduits 48, 50 or 32, will be manifested as a drop in pressure in these conduits and hence in the internal passage 46. The reduction of pressure in the passage 46 will reduce the fluid generated biasing force on the element 60 (as applied via the pilot line 46a) and will allow the fluid biasing force from the internal passage 40 as communicated via pilot line 64a to overcome the spring biasing force exerted by the spring 68 thereby driving the spool to the left as viewed in the FIGURE. In this position, the fluid communication between the branch passage 64 and the retraction circuit 62 is interrupted and the retraction circuit 62 is communicated with the pilot line 46a via the spool passage 65, allowing the retraction circuit to drain into the failed brake application circuit thereby completely depressurizing the retraction circuit and extinguishing the brake release force.

Failure in the other brake application circuit (the circuit fed by the conduit 30) does not produce movement in the valve spool 60. The valve spool 60 remains in the position shown in the FIGURE. It should be apparent that failure in this application circuit will be manifested as a loss of pressure in the internal passage 40 which in itself will prevent the pressurization of the retraction circuit 62 and in fact will allow the retraction circuit to drain into the failed circuit.

In the preferred system, the retraction circuit comprises apparatus disclosed in co-pending application Ser. No. 148,538. Preferably the portion of the circuit 62 located in the valve assembly 34 comprises a check valve 62a and a flow restriction 62b, arranged in a parallel flow relationship. The check valve 62a and restriction 62b communicate with a retraction supply conduit 80 through a port 80a. The conduit 80 divides into branch conduits 82 which communicate with the retraction fluid chambers 24 located in each brake assembly 10. A conduit 84 connects a fluid accumulator 86 to the retraction conduit 80. It will be recognized that in an alternate construction the check valve 62 and/or flow restriction 62b can be located outside of the valve assembly 34.

During normal brake actuation, pressurized fluid from the supply conduit 30 is communicated to the conduit 80 by way of the check valve 62a, which unrestrictedly communicates the branch conduit 64 with the conduit 80 (through the valve spool 60) but prevents reverse flow. The pressurization of the conduit 80 effects pressurization of the retraction chambers 24 as well as the accumulator 86. The brakes are deenergized by depressurizing the conduits 30, 32 and hence the brake conduits 42, 44, 48 and 50. Although the brake applying fluid chambers 20, 22 will immediately depressurize upon depressurization of the conduits 30, 32 the retraction circuit 62 and accumulator 86 cooperate to maintain pressure, at least temporarily, in the retraction chambers 24. Upon depressurization of the supply conduit 30, the check valve 62a closes to prevent fluid flow from the conduit 80 to the branch conduit 64 (via the valve spool 60) and forces the return flow of fluid from the retraction chambers to pass through the flow restriction 62b, thus retarding the depressurization of the chamber 24. The delay in depressurization is further amplified by the accumulator 86 which further extends the duration of pressurization of the retraction chambers 24. The resulting extended pressurization of the retraction chambers 24 drives the piston 12 away from the disc pack ensuring complete release of the vehicle brakes.

Although the invention has been described with a certain degree of particularity, it will be recognized that those having ordinary skill in the art can make various changes to it without departing from the spirit or scope of the invention as hereinafter claimed.

I claim:

1. For a brake system having brake assemblies actuated by a piston that includes first and second brake applying effective pressure areas and a brake release effective pressure area, an improved brake control system, comprising:
    (a) a source of pressurized fluid;
    (b) first and second conduit means in fluid communication with said first and second brake applying effective pressure areas;
    (c) a third conduit means in fluid communication with said brake release effective pressure area;
    (d) control valve means including a valve body and a condition responsive valve element movably disposed within said valve body for movement between two positions, operative to control the communication of pressurized fluid to said third supply conduit; and,
    (e) said valve body further defining a passage means for communicating said first conduit means with said third conduit means in response to one sensed condition, and operative to communicate said third conduit means with a discharge means defined by said valve body in response to a second sensed condition.

2. The control system of claim 1 wherein said one sensed condition is a normal brake condition and said second sensed condition is a brake failure condition.

3. The control system of claim 1 wherein said valve element is biased towards one position by the combination of a spring biasing force and the fluid pressure in said second conduit means and biased towards said second position by fluid pressure in said first conduit means.

4. The control system of claim 1 wherein said discharge means communicates with said second conduit means.

5. The control system of claim 1 wherein said control valve means further including a flow restriction and check valve valve body includes a flow restriction and cneck valve means for maintaining pressure in said third conduit means upon termination of pressure in said first and second conduit means.

6. A brake system for a wheeled vehicle such as an off-highway truck or the like, comprising:
    (a) a source of pressurized fluid;
    (b) a brake assembly for arresting rotation of a ground engaging wheel;
    (c) a piston for actuating said brake assembly, slidably mounted within a piston housing, said housing and piston together defining first and second brake applying pressure chambers and a brake releasing chamber;
    (d) brake application means including first and second supply conduits for conducting pressurized fluid to said brake applying pressure chambers;
    (e) brake releasing means including a release conduit for conveying pressurized fluid to said brake release chamber;
    (f) valve means for controlling communication of pressurized fluid to said release conduit including a pressure responsive element movable between two positions;
    (g) a first biasing means urging said element towards a first position in which fluid from said first supply conduit is communicated to said release conduit; and,
    (h) second biasing means urging said element towards a second position in which said release conduit is communicated with a discharge means defined by said valve means, said first and second biasing means combining to produce a net force maintaining said element in said first position under normal brake application and combining to drive said element to said second position upon a predetermined failure in said brake system.

7. The brake system of claim 6 wherein said first biasing means is generated by fluid pressure in the second supply conduit and a resilient spring mounted within said valve body and said second biasing means is provided by fluid pressure in said first supply conduit such that with equal fluid pressures in said first and second conduits, said spring maintains said valve element in the first position.

8. For a brake system in which braking members are engaged by the co-application of pressurized fluid through redundant brake application circuits and released by a brake retraction circuit, a control valve for discharging pressurized fluid from said retraction circuit in the event of failure in one of said brake apply circuits, comprising:
(a) a valve body including a pair of brake application input ports communicating with said redundant brake application circuits, a retraction port communicating with said retraction circuit and a discharge means for discharging fluid from said retraction circuit;
(b) a valve element slidably disposed within a bore defined by said valve body, said element including end surfaces defining opposed effective pressure areas in fluid communication with respective ends of said bore;
(c) passage means communicating the brake application ports with respective ends of said bore;
(d) said valve element movable between a first position in which one input port is communicated with said retraction port and a second position in which said retraction port is communicated with said discharge means; and,
(e) spring biasing means urging said valve element towards said first position such that under normal braking conditions said one application port is communicated with said retraction port and in the event of failure in the other brake application circuit, said valve element is shifted to said second position in which said retraction port is communicated with said discharge means and in the event of failure in the one brake application circuit, said valve element remains in its first position.

9. A brake system for a vehicle having at least one groung engaging wheel, comprising:
(a) a source of pressurized fluid;
(b) a brake assembly operatively connected to said wheel, including brake means;
(c) a piston means for engaging said brake means to arrest rotation of said wheel;
(d) said piston means defining three effective pressure areas configured such that pressurized fluid applied to first and second of the areas tends to urge said piston means in a brake application direction and fluid pressure applied to a third area tends to urge said piston means in a brake release direction;
(e) two brake fluid supply circuits for supplying pressurized fluid from said source to said piston means;
(f) valve means including a two position valve element biased by the combination of a spring and fluid generated biasing force towards a first position in which pressurized fluid from one brake supply circuit is communicated to said third effective pressure area and biased by fluid pressure in the one brake supply circuit towards a second position in which said release effective pressure area is communicated with a discharge means, such that upon failure in said other brake supply circuit, said valve element moves to its second position whereby pressurized fluid communicated to said release effective area is discharged, and such that upon failure in said one brake supply circuit, said valve element remains in its first position.

* * * * *